(12) United States Patent
Bauer et al.

(10) Patent No.: US 9,669,517 B2
(45) Date of Patent: *Jun. 6, 2017

(54) SUBMICRON ALPHA ALUMINA HIGH TEMPERATURE BONDED ABRASIVES

(71) Applicant: SAINT-GOBAIN CERAMICS & PLASTICS, INC., Worcester, MA (US)

(72) Inventors: Ralph Bauer, Niagara Falls (CA); Margaret L. Skowron, Niagara Falls, NY (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,216

(22) Filed: Aug. 25, 2015

(65) Prior Publication Data

US 2015/0360345 A1 Dec. 17, 2015

Related U.S. Application Data

(63) Continuation of application No. 14/170,081, filed on Jan. 31, 2014, now Pat. No. 9,144,887, which is a continuation of application No. 11/954,735, filed on Dec. 12, 2007, now Pat. No. 8,932,378.

(60) Provisional application No. 60/870,740, filed on Dec. 19, 2006.

(51) Int. Cl.
| | |
|---|---|
| *B24D 3/16* | (2006.01) |
| *B24D 3/14* | (2006.01) |
| *B24D 3/34* | (2006.01) |
| *B24D 18/00* | (2006.01) |
| *C04B 35/111* | (2006.01) |
| *C04B 35/117* | (2006.01) |
| *C04B 35/119* | (2006.01) |
| *C09K 3/14* | (2006.01) |

(52) U.S. Cl.
CPC ........... *B24D 3/14* (2013.01); *B24D 3/16* (2013.01); *B24D 3/342* (2013.01); *B24D 18/00* (2013.01); *C04B 35/111* (2013.01); *C04B 35/117* (2013.01); *C04B 35/119* (2013.01); *C09K 3/1409* (2013.01); *C04B 2235/3206* (2013.01); *C04B 2235/3225* (2013.01); *C04B 2235/3232* (2013.01); *C04B 2235/3275* (2013.01); *C04B 2235/3409* (2013.01); *C04B 2235/3418* (2013.01); *C04B 2235/36* (2013.01); *C04B 2235/5409* (2013.01); *C04B 2235/5445* (2013.01); *C04B 2235/656* (2013.01); *C04B 2235/77* (2013.01); *C04B 2235/785* (2013.01); *C04B 2235/96* (2013.01); *C04B 2235/9661* (2013.01)

(58) Field of Classification Search
None
See application file for complete search history.

(56) References Cited

U.S. PATENT DOCUMENTS

| | | | | |
|---|---|---|---|---|
| 4,623,364 | A | * 11/1986 | Cottringer | ............... C01F 7/442 51/293 |
| 4,744,802 | A | 5/1988 | Schwabel | |
| 4,881,951 | A | 11/1989 | Wood et al. | |
| 5,009,676 | A | 4/1991 | Rue et al. | |
| 5,139,978 | A | 8/1992 | Wood | |
| 5,219,806 | A | 6/1993 | Wood | |
| 5,259,147 | A | 11/1993 | Falz et al. | |
| 5,282,875 | A | 2/1994 | Wood et al. | |
| 5,551,963 | A | * 9/1996 | Larmie | .................... B24D 3/14 51/307 |
| 2004/0148869 | A1 | * 8/2004 | Celikkaya | ................ B24D 3/00 51/308 |

FOREIGN PATENT DOCUMENTS

| | | |
|---|---|---|
| CA | 2407736 A1 | 10/2002 |
| JP | 08-502232 A | 3/1996 |
| KR | 0139203 | 4/1998 |
| KR | 20050101196 | 10/2005 |
| WO | 94/07809 A | 4/1994 |

OTHER PUBLICATIONS

US 5,468,269, 11/1995, Larmie (withdrawn)

* cited by examiner

*Primary Examiner* — Melvin C Mayes
*Assistant Examiner* — Colette Nguyen
(74) *Attorney, Agent, or Firm* — Abel Law Group, LLP; Adam Keser

(57) ABSTRACT

A high temperature bonded abrasive includes alumina abrasive grits, and a vitreous bond matrix in which the alumina abrasive grits are distributed, the vitreous bond matrix having a cure temperature not less than 1000° C. The alumina abrasive grits include polycrystalline alpha alumina having a fine crystalline microstructure characterized by an alpha alumina average domain size not greater than 500 nm, and the alumina abrasive grits further include a pinning agent that is a dispersed phase in the polycrystalline alpha alumina.

19 Claims, No Drawings

SUBMICRON ALPHA ALUMINA HIGH TEMPERATURE BONDED ABRASIVES

CROSS REFERENCE TO RELATED APPLICATIONS

The present application is a continuation of U.S. patent application Ser. No. 14/170,081, filed Jan. 31, 2014, entitled "SUBMICRON ALPHA ALUMINA HIGH TEMPERATURE BONDED ABRASIVES", naming inventors Ralph Bauer and Margaret L. Skowron, now U.S. Pat. No. 9,144,887, which is a continuation of U.S. patent application Ser. No. 11/954,735, filed Dec. 12, 2007, is now U.S. Pat. No. 8,932,378, issued Jan. 13, 2015, entitled "SUBMICRON ALPHA ALUMINA HIGH TEMPERATURE BONDED ABRASIVES", naming inventors Ralph Bauer and Margaret L. Skowron, which claims priority from U.S. Provisional Patent Application No. 60/870,740, filed Dec. 19, 2006, entitled "SUBMICRON ALPHA ALUMINA HIGH TEMPERATURE BONDED ABRASIVES", naming inventors Ralph Bauer and Margaret L. Skowron, which application is incorporated by reference herein in its entirety.

BACKGROUND

Field of the Disclosure

Aspects of the present invention are generally directed to high temperature bonded abrasive tools and components, particularly, high temperature bonded abrasives that incorporate fine microstructure alumina abrasive grits.

Description of the Related Art

High performance abrasive materials and components have long been used in various industrial-machining applications, including lapping/grinding, in which bulk material removal is executed, to fine polishing, in which fine micron and submicron surface irregularities are addressed. Typical materials that undergo such machining operations include various ceramics, glasses, glass-ceramics, metals and metal alloys. Abrasives may take on any one of various forms, such as free abrasives as in an abrasive slurry in which loose abrasive particles in suspension are used for machining. Alternatively, abrasives may take the form of a fixed abrasive, such as a coated abrasive or a bonded abrasive. Coated abrasives are generally categorized as abrasive components having an underlying substrate, on which abrasive grits or grains are adhered thereto through a series of make coats and size coats. Bonded abrasives typically do not have an underlying substrate and are formed of an integral structure of abrasive grits that are bonded together via a matrix bonding material.

State of the art bonded abrasives take advantage of vitreous bonding materials, such as silica-based glass bonding matrices. Alternatively, specialized bonded abrasives for certain applications incorporate superabrasive grits, such as cubic boron carbide and diamond, and may be integrally bonded through the use of a metal alloy bond matrix.

While bonded abrasives have continued to undergo development in recent years, particular attention has been paid to high temperature bonded abrasives that utilize a bonding matrix formed of a vitreous material. An example of a high temperature bonded abrasive component is described in U.S. Pat. No. 5,282,875. While state of the art high temperature bonded abrasive components have improved performance and durability, a need continues to exist in the art for further improved components.

SUMMARY

According to one aspect, a high temperature bonded abrasive is provided that includes alumina abrasive grits and a vitreous bond matrix in which the abrasive grits are distributed. The vitreous bond matrix has high temperature properties, including a cure temperature not less than about 1000° C. The alumina abrasive grits comprise polycrystalline α-alumina having a fine crystalline microstructure characterized by an α-alumina average domain size not greater than 500 nm. The alumina abrasive grits further comprise a pinning agent, the pinning agent comprising a dispersed phase in the polycrystalline α-alumina phase.

According to another aspect, a high temperature bonded abrasive is provided that includes alumina abrasive grits and a vitreous bond matrix in which the grits are distributed. The vitreous bond matrix has a cure temperature not less than 1000° C. The alumina abrasive grits comprise polycrystalline α-alumina having a fine crystalline microstructure characterized by an average domain size of not greater than 300 nm. Further, the alumina abrasive grits comprise a pinning agent including at least a zirconium oxide phase dispersed in the polycrystalline α-alumina phase.

In addition, a method for forming a high temperature bonded abrasive is provided. The method calls for forming fine crystalline microstructure α-alumina abrasive grits by heat-treating α-alumina precursor containing a pinning agent at a temperature not less than 1350° C. A shaped body is then formed containing the α-alumina grits and a vitreous bond matrix material. Further, heat treatment of the shaped body is carried out at a cure temperature not less than 1000° C. and above the melting point of the vitreous bond matrix material. The alumina abrasive grits have an average crystalline domain size not greater than about 300 nm after heat-treating.

DESCRIPTION OF THE EMBODIMENTS

According to an embodiment, a high-temperature bonded abrasive includes alumina abrasive grits that have a particularly fine microstructure and a vitreous bond matrix in which the alumina abrasive grits are distributed.

Turning first to a description of the alumina abrasive grits, typically the alumina abrasive grits are principally formed of polycrystalline α-alumina. The polycrystalline α-alumina generally forms the majority phase of the grits, that is, at least 50% by weight. However, generally the alumina abrasive grits are at least 60 wt. %, oftentimes at least 80 wt. %, and in certain embodiments at least 90 wt. % polycrystalline α-alumina. The polycrystalline α-alumina has a fine crystalline microstructure that may be characterized by an α-alumina average domain size not greater than 500 nm. The crystalline domains are discrete, identifiable crystalline regions of the microstructure that are formed of an aggregation of single crystals, or may be formed of a single crystal. However, according to certain embodiments, the crystalline domains are monocrystalline and are easily observed through scanning electron microscopy analysis. The crystalline domain size may be even finer, such as not greater than 400 nm, or not greater than 300 nm. With the even finer crystal domain size, typically the domains are single crystalline as noted above. Such fine domains may be particularly small, such as not greater than 200 nm, not greater than 190 nm, or even not greater than 180 nm. It is noteworthy that the fine crystalline domain size is present in the high temperature bonded abrasive component, post-processing. This is particularly noteworthy, as oftentimes the process for forming the high temperature bonded abrasive involves high temperature treatment at which the vitreous bond matrix cures. Such high temperature treatment has a tendency to cause domain growth, which is particularly undesirable. Further details are provided below.

As noted above, the alumina abrasive grits further include a pinning agent. A pinning agent is a material that is foreign to the α-alumina microstructure of the grits, and can be identified by a second phase dispersed in the polycrystalline α-alumina matrix phase. The pinning agent is generally effective to "pin" the domains, thereby preventing exaggerated domain growth during sintering and/or high temperature processing of the grits to form the bonded abrasive component. Examples of a pinning agent include oxides, carbides, nitrides and borides, as well as reaction products thereof with the polycrystalline α-alumina matrix. According to particular embodiments, the pinning agent comprises an oxide of at least one of silicon, boron, titanium, zirconium, and a rare-earth element, and reaction products thereof with the polycrystalline α-alumina matrix. A particular pinning agent is zirconium oxide, generally in the form of $ZrO_2$ (zirconia). Zirconium oxide is particularly suitable material, and generally is inert within the polycrystalline α-alumina matrix, so as to undergo very limited reaction with the alumina thereby retaining a zirconium oxide crystal phase, typically zirconia. The pinning agent is generally present in the alumina abrasive grits in an amount not less than about 0.1 wt. %, such as an amount not less than about 0.5 wt. %, or not less than about 1.0 wt. %. The lower limit of the pinning agent is chosen to be an amount that is effective to prevent exaggerated domain growth.

According to one embodiment, the pinning agent is present in the abrasive grits in an amount not greater than 40 wt. %, such as an amount not greater than 30 wt. %, not greater than 20 wt. % or even not greater than 10 wt. %. In the high temperature bonded abrasive, the pinning agent is generally identified as having a particulate size not greater than 5 microns, such as not greater than 1 micron. Fine particulate sizes associated with the pinning agent have been found to be useful, such as not greater than 500 nm, or not greater than 300 nm, or not greater than 200 nm. As described in more detail below, in the context of methods for forming high temperature bonded abrasive components, the pinning agent may be introduced into the alumina abrasive grits in solid form, such as in sub-micron form, particularly including colloidal form. Alternatively, the pinning agent may be introduced into the alumina abrasive grits or precursor thereof, such that upon high temperature heat treatment the pinning agent precursor converts into a desired crystalline phase such as the desired oxide, carbide, nitride or boride.

Processing to form a high temperature bonded abrasive according to embodiments of the present invention generally begins with the formation of the alumina abrasive grits. According to a particular embodiment, the alumina abrasive grits are formed through a seeded process, in which an appropriate seeding material is combined with an α-alumina precursor, followed by heat treatment to convert the α-alumina precursor into the desired α-alumina phase. The seeds may be formed in accordance with U.S. Pat. No. 4,623,364, in which seeded gel alumina dried precursor is calcined to form α-alumina. The calcined α-alumina may be further processed such as by milling to provide an appropriate high-surface area seed material. Typically, the surface area is quantified by specific surface area (SSA), not less than 10 $m^2/g$, typically not less than 20 $m^2/g$, such as not less than 30 $m^2/g$, or not less than 40 $m^2/g$. Particular embodiments have a surface area not less than 50 $m^2/g$. Generally, the surface area is limited, such as not greater than 300 $m^2/g$, such as not greater than 250 $m^2/g$.

The seed material is then combined with the α-alumina precursor, which may take on any one of several forms of aluminous materials that is an appropriate form for conversion to α-alumina. Such precursor materials include, for example, hydrated aluminas, including alumina trihydrate (ATH) and boehmite. As used herein, boehmite denotes alumina hydrates including mineral boehmite, typically being $Al_2O_3 \cdot H_2O$ and having a water content on the order of 15%, as well as pseudo-boehmite, having a water content greater than 15%, such as 20% to 38%. As such, the term boehmite will be used to denote alumina hydrates having 15 to 38% water content, such as 15 to 30% water content by weight. It is noted that boehmite, including pseudo-boehmite, has a particular and identifiable crystal structure and accordingly, a unique X-ray diffraction pattern, and as such, is distinguished from other aluminous materials, including other hydrated aluminas.

Typically, the α-alumina precursor, such as boehmite is combined with the seeded material such that the seeds are present in an amount not less than 0.2 wt. % with respect to total solids content of seeds and α-alumina precursor. Typically, the seeds are present in a amount less than 30 wt. %, or, typically, in an amount not greater than 20 wt. %.

The seeds and the α-alumina precursor are generally combined in slurry form, which is then gelled, such as by the addition of an appropriate acid or base, such as nitric acid. Following gellation, the gel is typically dried, crushed, and dried material is passed through classification sieves. The classified solid fraction may then be subjected to a sintering process that has limited soak time. Typically, sintering is carried our for a time period not exceeding 30 minutes, such as not greater than 20 minutes, not greater than 15 minutes. According to particular embodiments, the sintering period is particularly short, such as not greater than 10 minutes.

According to a particular development, a pinning agent or pinning agent precursor is added to the suspension containing seeds and α-alumina precursor. Typically, the pinning agent or pinning agent precursor is present in an amount not greater than 40 wt. % based upon the combined solids content of the α-alumina precursor, seeds, and pinning agent or pinning agent precursor (calculated based upon solids content of the pinning agent in the final α-alumina grit). Generally, the pinning agent is present in an amount not less than 0.1 wt. %, such as not less than about 0.5 wt. %, or even not less than about 1 wt. %, based upon the total solids content as noted above.

Still further, according to a particular development, sintering is carried out at a temperature above the temperature that is necessary to effect conversion of the α-alumina precursor into α-alumina. In a sense, certain embodiments call for "over-sintering" the α-alumina precursor material. Particularly suitable temperatures are generally not less than 1350° C., such as not less than 1375° C., not less than 1385° C., not less than 1395° C. or not less than 1400° C. In this respect, it is noted that while fine microstructured seeded α-alumina materials have been formed in the art, typically such materials are processed at lower temperatures, oftentimes below 1350° C., such as on the order of 1300° C. Further observations on the combined effect of utilization of a pinning agent and over-sintering are provided herein below.

Following sintering, optionally classified abrasive grits are then combined with a vitreous bond material, shaped into an appropriate geometric contour (e.g., grinding wheel), which contours and shapes are well appreciated in the context of the bonded abrasives art. Processing to complete the bonded abrasive component typically involves heat treatment at a cure temperature. As used herein, cure temperature denotes a material parameter associated with the vitreous bond matrix material, and is generally in excess of the melting temperature, and particularly, the glass transition temperature $T_g$ of the bonding material. The cure temperature is the minimum temperature at which the bond matrix material not only softens and becomes flowable, but also becomes flowable to an extent ensuring complete wetting and bonding to the abrasive grits. Typically, the cure temperature according to embodiments herein is not less than 1000° C., generally indicating formation of a high temperature bonded abrasive.

Particular examples were made according to the following description.

EXAMPLES

Example 1 (Comparative)

In a 400 ml pyrex beaker, 30 grams of aluminum oxide hydroxide (pseudo boehmite) powder under the trade name DISPERAL obtained from Sasol Inc of Hamburg Germany was stirred into 61 milliliters of deionized water (resistivity 2 mega-ohm cm).

As a seed feedstock, seeded gel alumina dried precursor as prepared in U.S. 4,623,364 was calcined at 1100 C for 5 minutes in a rotary kiln to convert the alumina to a form with a surface area as measured by the BET method of 15 to 28 $m^2/g$. 72 kg of this α-alumina feedstock was mixed with 150 kg of deionized water and fed into a horizontal bead mill manufactured by Netzsch Company (headquarters Selb, Germany). The model of the device was LMZ-25. Milling was conducted for 24 hours with the slurry continuously circulating through the mill. Approximately 40 kg of alumina abrasive as manufactured by Saint-Gobain in size 46 grit was employed as the milling media. After milling the surface area was about 75 $m^2/g$.

To the slurry of Disperal, 1.43 grams of the seed slurry prepared above was added with stirring.

To this mixture was then added with stifling, 7.5 grams of 20% by weight HNO3 solution while stifling was continued the resultant mixture formed a gel.

The gel was dried overnight at 95° C. and then crushed with a wooden rolling pin. The fraction of grits passing through a 30 mesh sieve and remaining on a 45 mesh sieve was retained.

5 grams of the retained grits were then placed in an alumina boat and placed into a preheated tube furnace (Lindberg Blue M series STF 55433) for sintering. Sintering was conducted for a total of 5 minutes.

Specimens were sintered at 3 different temperatures, 1300° C., 1350° C. and 1400° C. Hardness and crystal size properties were measured.

Bonded abrasive components of the sintered grits containing a vitreous bond matrix were made by mixing 1.22 grams of the sintered grits with 0.72 grams of powder glass and adding 2 drops of 7.5% by weight Poly vinyl alcohol (PVA) solution. The composition of the glass powder is generally silica based, having a majority component of silica. Typical silica content is not less than 50% by weight, typically not less than 60% by weight, such as not less than 65% by weight. Additional components of the glass powder include oxides such as alumina, sodium oxide, magnesia, potassium oxide, lithium oxide, boron oxide, titania, iron oxide, calcia, other oxides and combinations thereof. The particular composition of the glass powder forming the bond matrix is chosen to have a desirably high cure temperature and Tg as discussed in detail above. The mixture was then placed into a 1.25 cm stainless steel mold and pressed at 10,000 psi. The resultant disc was then placed into a cool muffle furnace (Lindberg type 51524) and heated up to 1250° C. in 8 hours, held at this temperature for 4 hours and then cooled in 8 hours. The resultant disc was prepared as a polished section and hardness and crystal size measured.

Example 2

This example illustrates the effect of a $ZrO_2$ pinning agent to prevent undesirable crystal growth and to provide corrosion resistance.

An abrasive grit ceramic body was prepared as in Example 1 except that colloidal $ZrO_2$ was added at levels of 0.5% by weight relative to the final alumina value, 1.0% relative to the final alumina value and 2.0% relative to the final alumina value. The source of $ZrO_2$ was NYACOL 20 nm colloidal $ZrO_2$ acetate stabilized form obtained from Nyacol. Specimens were prepared and measured as in Example 1.

Example 3

This example illustrates the effect of a $SiO_2$ pinning agent to prevent undesirable crystal growth and to provide corrosion resistance.

An abrasive grit ceramic body was prepared as in Example 1 except that colloidal $SiO_2$ was added at levels of 0.5% by weight relative to the final alumina value, 1.0% relative to the final alumina value and 2.0% relative to the final alumina value. The source of $SiO_2$ was NYACOL colloidal $SiO_2$ ammonia stabilized form obtained from Nyacol Inc, Ashland, Mass. Specimens were prepared and measured as in example 1.

Example 4

This example illustrates the effect of a $Y_2O_3$ pinning agent to prevent undesirable crystal growth and to provide corrosion resistance.

An abrasive grit ceramic body was prepared as in Example 1 except a solution of yttrium nitrate was added at equivalent yttrium oxide levels of 0.5% by weight relative to the final alumina value, 1.0% relative to the final alumina value and 2.0% relative to the final alumina value. The source of yttrium nitrate was from Alrdich chemicals. Specimens were prepared and measured as in Example 1

Example 5

This example illustrates the effect of the pinning/anti-corrosion agent in a composite body, which includes magnesium oxide. Material was made as in example 2 with 2% by weight $ZrO_2$ and 1% by weight of MgO added as a solution of magnesium nitrate. This example also incorporates a cobalt oxide (0.08%) colored marker as a visual indicator of extent of corrosion. The cobalt oxide precursor used was cobalt nitrate.

Crystal domain size of the examples described above was then measured by scanning electron microscopy (SEM) of a polished section of the Examples. Magnification of 50,000× was typically used, and specimens were thermally etched for 5 minutes at 100° C. below the sintering temperature and the crystal domain size is reported or obtained by the intercept method without statistical correction. According to embodiments herein, crystal domains are fairly stable at high temperature, which may be quantified in terms of Crystal Stability. Crystal Stability is defined herein as the temperature at which the alumina abrasive grits undergo limited domain growth quantified by average domain size not greater than 500 nm, after 5 minutes of exposure at such temperature. Embodiments herein have a Crystal Stability of at least 1400° C., such as at least about 1500° C.

In addition to quantification of crystal domain size, the extent of corrosion was quantified using several techniques. During formation of the high temperature bonded abrasive, the vitreous bond material matrix has a tendency to penetrate and react with the alumina grits. Such attack is highly undesirable, and may be measured in terms of hardness. Herein, hardness was measured by taking hardness data of a small sintered body (about 0.5 mm) at its center and near the outer edge (approximately 15 to 30 microns from the outer edge). The well-known Vickers microindentation method is used with a 500 g load. It is observed that as the ceramic body undergoes corrosion, the hardness near the outer (exposed) edge decreases as softer phases are formed by reaction with the molten silicate glass. Corrosion was also measured by incorporating a colored (marker) such as cobalt oxide, at a level of several hundred ppm which forms a blue colored cobalt aluminate in the sintered body. The depth of corrosion can be monitored visually by observing the fading of the cobalt aluminate blue color due to reaction with the silicate phases. Additionally, and particularly noteworthy, the corrosion may be quantified in terms of corrosion index, represented by the average depth of Si penetration after exposure of the alumina abrasive grits to molten silica glass at 1250° C. for 4 hours. Embodiments herein show a corrosion index not greater than 15 microns, such as not greater than 10 microns, or even not greater than 8 microns.

Characterization of the ceramic bodies synthesized in Examples 1-5 are summarized in Tables 1 and 2.

TABLE 1

Illustrates resistance to crystal domain growth as a function of temperature, reported in microns.

| TEMP C/Xtal size u | Ex | Ex 2 (ZrO2) | | | Ex 3 (SiO2) | | | Ex 4 (Y2O3) | | | Ex 5 (2% ZrO$_2$ + 1% MgO + 0.08 CoO) |
|---|---|---|---|---|---|---|---|---|---|---|---|
| | | 0.5 | 1.0 | 2.0 | 0.5 | 1.0 | 2.0 | 0.5 | 1.0 | 2.0 | |
| 1300 | 0.15 | ND | ND | ND | ND | ND | ND | ND | ND | ND | ND |
| 1350 | ND | 0.12 | 0.13 | 0.13 | 0.10 | 0.09 | 0.07 | 0.17 | 0.15 | 0.15 | 0.14 |
| 1400 | 0.56 | 0.16 | 0.16 | 0.16 | 0.11 | 0.08 | 0.07 | 0.16 | 0.19 | 0.17 | 0.15 |
| 1500 | >1 | ND | ND | ND | 0.15 | 0.20 | 0.13 | 0.43 | 0.42 | 0.28 | ND |

The results in Table 1 clearly show that Example 1 undergoes dramatic domain growth as a function of temperature. The examples containing various amounts of pinning agents reduce the sensitivity to grain growth as a function of temperature and thus extend the useful temperature range of application.

TABLE 2

Resistance to Corrosion
All Samples Sintered ≥97% of Theoretical Density

| | Ex 1400° C. | Ex 2 (ZrO2) 1400° C. | | | Ex 3 (SiO2) 1500° C. | | | Ex 4 (Y2O3) 1500° C. | | | Ex 5 (2% ZrO$_2$ + 1% MgO + 0.08 CoO) 1400° C. |
|---|---|---|---|---|---|---|---|---|---|---|---|
| | | 0.5 | 1.0 | 2.0 | 0.5 | 1.0 | 2.0 | 0.5 | 1.0 | 2.0 | |
| Edge Hardness Before Test (Gpa) | 20.3 | 20.7 | 20.6 | 21.3 | 20.1 | 17.6 | 13.6 | 19.7 | 20.0 | 20.6 | 20.4 |
| Edge Hardness After Test (Gpa) | 16.3 | 16.0 | 18.2 | 19.4 | 14.5 | 12.5 | 11.8 | 19.0 | 18.8 | 17.5 | 19.0 |
| Si Penetration (EDS) (um) | 20-30 | | | | | 5 | | | | | 5 |

* Example 1 doped with 0.08% by weight CoO as described in example 5

Table 2 illustrates that additives of zirconia or yttria clearly reduce the reactivity of the grain with glass as demonstrated by better retention of hardness. Additionally, use of additives such as $ZrO_2$ clearly minimize the penetration of invasion of $SiO_2$ into the grain and provide a more stable grain in view of molten glass. Additionally, it is clearly observed that when a cobalt oxide additive is used as a color indicator, the extent of reaction when additives such as ZrO2 is employed is much lower as evidenced by the retention of the blue color.

According to embodiments herein, particularly desirable fine-microstructured high temperature bonded abrasive components have been provided. Such fine-microstructured components are notable over the state of the art, which is generally limited to medium-microstructured high temperature bonded abrasives as exemplified in U.S. Pat. No. 5,282,875, which teaches, at best, a microstructure having 600 nm crystal domains and α-alumina single crystals having a size of 350 nm and larger (see U.S. Pat. No. 4,744,802, incorporated by reference into U.S. Pat. No. 5,282,875). While fine-microstructured alumina abrasive grits have been utilized in the past for free abrasive applications, such fine microstructured alumina abrasive grits typically have not been utilized in the context of high temperature bonded abrasive applications. Such fine-microstructured materials have been found to dissolve in the vitreous bond matrix material during processing and/or undergo exaggerated crystal domain growth during heat treatment associated with such high temperature bonded abrasives. This is clearly shown in Example 1 described above, in which an initially fine-microstructured material was shown to experience exaggerated domain growth and excessive corrosion.

While not wishing to be bound by any particular theory, it is believed that the combination of the use of a pinning agent and over-sintering the abrasive grits results a highly stable grit that is resistant to microstructural change during high temperature processing such as high temperature use applications. It is believed that the pinning agent is effective to grain growth that is normally observed at elevated temperatures, while the over-sintering processes condition is believed to impart notably improved anti-corrosion characteristics and further enhance the pinning effect of the pinning agent. The higher sintering temperatures as described herein may result in grain boundary phases that are more resistant to corrosion by way of modified crystallization of the grain boundary, or uniform distribution of the grain boundary volume and/or selective dissolution of certain grain boundary elements into the matrix. The over-sintering condition may also synergistically affect the pinning agent in a manner to impart additional corrosion resistance into the abrasive grit. Whatever the mechanism, the observed effects are clear in that the high temperature bonded abrasive components according to embodiments herein exhibit stable corrosion characteristics.

It is further noted that prior art seeding technology has mentioned utilization of grain growth stabilizers, including various oxide stabilizers, as well as sintering temperatures above 1300° C. normally associated with sintering of seeded sol-gel alumina abrasive grits. However, such grain growth inhibitors and sintering temperatures have been taught in connection with the general manufacture of α-alumina materials, and it has been believed that such fine-microstructured materials would also suffer from exaggerated grain growth and/or excessive corrosion in the context of a high-temperature bonded abrasive component. However, it was surprisingly discovered that the combination of pinning agent materials and over-sintering conditions addressed the marked deficiencies of not only crystal domain growth during processing and use conditions of the high temperature bonded abrasive, but also corrosion resistance.

While embodiments of the invention have been illustrated and described with particularity, the invention is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A high temperature bonded abrasive component, comprising:
   alumina abrasive grits; and
   a vitreous bond matrix that bonds alumina abrasive grits to each other and in which the alumina abrasive grits are distributed, the vitreous bond matrix having a cure temperature not less than 1000° C., wherein
   the alumina abrasive grits comprising polycrystalline alpha alumina having an average domain size of not greater than 300 nm, and wherein the alumina abrasive grits further comprise a pinning agent, the pinning agent comprising a dispersed phase in the polycrystalline alpha alumina,
   and wherein the alumina abrasive grits have a Crystal Stability of at least 1400° C., where Crystal Stability is the temperature at which the alumina abrasive grits undergo domain growth quantified by an average domain size not greater than 300 nm, after 5 minutes of exposure at said temperature.

2. The high temperature bonded abrasive of claim 1, wherein the pinning agent comprises an oxide, a carbide, a boride, a nitride, a reaction product of any of the foregoing elements with the polycrystalline alpha alumina, or a combination thereof.

3. The high temperature bonded abrasive of claim 2, wherein the pinning agent comprises an oxide of at least one element including silicon, boron, titanium, zirconium, a rare earth element, a reaction product of any of the foregoing elements with the polycrystalline alpha alumina, or a combination thereof.

4. The high temperature bonded abrasive of claim 3, wherein the pinning agent comprises zirconium oxide.

5. The high temperature bonded abrasive of claim 1, wherein the pinning agent is present in the alumina abrasive grits in an amount of not less than about 0.1 wt % and not greater than 40 wt % based on the total weight of the alumina abrasive grits.

6. The high temperature bonded abrasive of claim 5, wherein the pinning agent is present in the alumina abrasive grits in an amount of not less than about 0.1 wt % and not greater than 10 wt % based on the total weight of the alumina abrasive grits.

7. The high temperature bonded abrasive of claim 1, wherein the pinning agent has an average particulate size not greater than about 5 μm.

8. The high temperature bonded abrasive of claim 7, wherein the pinning agent has an average particulate size not greater than about 1 µm.

9. The high temperature bonded abrasive of claim 8, wherein the pinning agent has an average particulate size not greater than about 500 nm.

10. The high temperature bonded abrasive of claim 9, wherein the pinning agent has an average particulate size not greater than about 200 nm.

11. The high temperature bonded abrasive of claim 1, wherein the alumina abrasive grits have an average crystal domain size not greater than 200 nm.

12. The high temperature bonded abrasive of claim 11, wherein the alumina abrasive grits have an average crystal domain size not greater than 190 nm.

13. The high temperature bonded abrasive of claim 12, wherein the alumina abrasive grits have an average crystal domain size not greater than 180 nm.

14. The high temperature bonded abrasive of claim 1, wherein the alumina abrasive grits have a Corrosion Index not greater than 15 µm, wherein Corrosion Index is the average depth of Si penetration after exposure of the alumina abrasive grits to molten silica glass at 1250° C. for 4 hours.

15. The high temperature bonded abrasive of claim 14, wherein the Corrosion Index is not greater than 10 µm.

16. The high temperature bonded abrasive of claim 15, wherein the Corrosion Index is not greater than 8 µm.

17. The high temperature bonded abrasive of claim 1, wherein the alumina abrasive grits have a Crystal Stability of at least 1500° C.

18. The high temperature bonded abrasive of claim 1, wherein the vitreous bond matrix has a cure temperature not less than 1100° C.

19. The high temperature bonded abrasive of claim 1, wherein the vitreous bond matrix has a glass transition temperature $T_g$ not less than about 1000° C.

* * * * *